US007706741B2

(12) United States Patent
Patel et al.

(10) Patent No.: US 7,706,741 B2

(45) Date of Patent: Apr. 27, 2010

(54) INTEGRATED MOBILE COMMUNICATION AND BROADCAST PROGRAM REPRODUCTION DEVICE

(75) Inventors: Labhesh Patel, San Francisco, CA (US); Mukul Jain, San Jose, CA (US); Joseph Khouri, San Jose, CA (US); Sanjeev Kumar, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1050 days.

(21) Appl. No.: 11/334,909

(22) Filed: Jan. 19, 2006

(65) Prior Publication Data

US 2007/0178828 A1 Aug. 2, 2007

(51) Int. Cl.
*H04Q 7/20* (2006.01)

(52) U.S. Cl. .................... 455/3.05; 455/3.06; 455/3.01; 455/567; 455/414.1; 455/550.1; 348/14.01; 348/14.02; 386/1; 386/35; 725/62; 725/63; 725/68; 725/70; 725/75

(58) Field of Classification Search ................ 455/3.05, 455/3.06, 3.01, 422.1, 567, 403, 412.1, 412.2, 455/418–420, 550.1, 414.1, 414.3, 414.4, 455/500, 517, 512; 348/14.01, 14.02, 14.04; 386/1, 35, E5.078; 725/62, 63, 68, 70, 75, 725/76, 81, 87, 88
See application file for complete search history.

(56) References Cited

U.S. PATENT DOCUMENTS 5,671,195 A * 9/1997 Lee ............................... 369/7
7,058,376 B2 * 6/2006 Logan et al. ............. 455/186.1
7,369,744 B2 * 5/2008 Tobiishi ....................... 386/46
2003/0017857 A1 * 1/2003 Kitson et al. ................ 455/566
2006/0184983 A1 * 8/2006 Casey .......................... 725/89
2007/0010292 A1 * 1/2007 Vetelainen et al. .......... 455/566
2007/0216760 A1 * 9/2007 Kondo et al. ............. 348/14.02

FOREIGN PATENT DOCUMENTS

EP 1398947 A2 * 8/2003
JP 2004193944 * 7/2004

OTHER PUBLICATIONS

"A VC: Digital Radio (Continued)", [online]. [archived on Apr. 3, 2004]. Retrieved from the Internet: <URL: http://web.archive.org/web/20040403203028/http://avc.blogs.com/a_vc/2004/02/digital_radio_c.html>, 4 pgs.

* cited by examiner

*Primary Examiner*—Keith T Ferguson
(74) *Attorney, Agent, or Firm*—Schwegman, Lundberg & Woessner, P.A.

(57) ABSTRACT

A method for controlling operation of an integrated mobile communication and broadcast program reproduction device and of operating the device includes monitoring an occurrence of a trigger event at the device; and upon occurrence of the trigger event, recording a broadcast program signal received by the device. An integrated mobile communication and broadcast program reproduction device has a trigger event monitor and a broadcast program recorder for recording a broadcast program when a trigger event occurs. A trigger event may be receipt of an incoming call, the making of an outgoing call, the identification of predetermined content in a received program and the start of a predetermined program. Different trigger events may be prioritized. Recorded material may be reproduced, with broadcast material being received being recorded whilst previously recorded material is reproduced.

26 Claims, 9 Drawing Sheets

INTEGRATED MOBILE COMMUNICATION AND BROADCAST PROGRAM REPRODUCTION DEVICE

TECHNICAL FIELD

This application relates to the fields of telephonic communication and broadcast communication.

BACKGROUND

A mobile communication terminal device such as a cellular telephone for permitting mobile telephonic communication over a cellular communication network is well known. Portable reproduction devices such as a portable commercial radio broadcast receiver, a portable television broadcast receiver, and a playback device are also well known.

The integration of mobile communication terminal devices and portable reproduction devices has received attention from inventors in the past, thereby to satisfy a user who is desirous of a unit which serves as both an integrated communication and broadcast program reproduction device.

Integration of a mobile telephonic communication device and a portable broadcast program reproduction device to form an integrated mobile communication and broadcast program reproduction device (integrated device) may pose some inconvenience to a user.

It may thus happen that a person is listening to or watching a radio program or a television program and the person desires to use the integrated device for telephonic communication, with the result that the person has to stop listening to or watching the program.

Thus, the user may want to use the integrated device as a telephone whilst simultaneously recording a program that is being broadcast for later reproduction.

Further, a user of the integrated device may be unaware that a program is being broadcast in which he is interested. In such case, it may be desirable for a user automatically to be notified that the program has commenced, or is about to commence, so that the user may reproduce the program by means of the integrated device, or the program may be automatically recorded.

In addition, a user may want to monitor programs being broadcast to ascertain if any of them are of interest and then to reproduce or record the program. The user may also want to prioritize programs.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
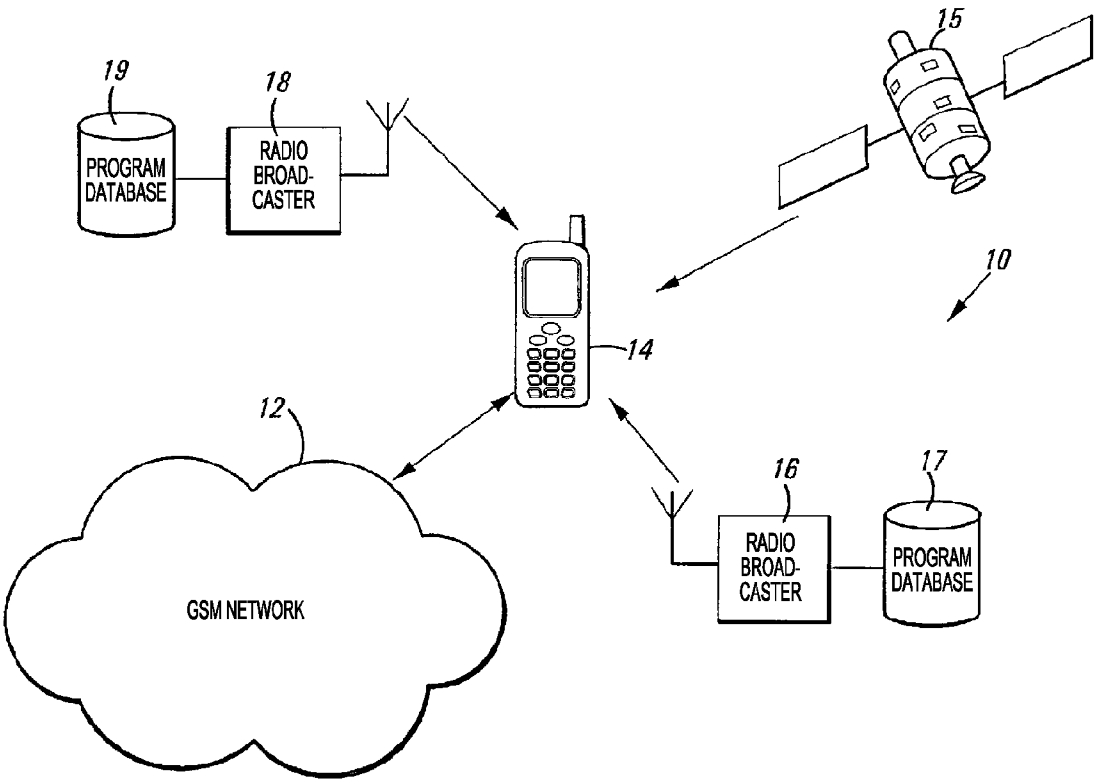
FIG. 1 is a schematic architecture of a communication system, of which an integrated communication and broadcast reproduction device, in accordance with an example embodiment, forms part.

In the following description, for purposes of explanation, numerous specific details are set forth in order to provide a thorough understanding of an embodiment of the present invention. It will be evident, however, to one skilled in the art that the present invention may be practiced without these specific details.

In the drawings, reference numeral 10 generally indicates a communication system, which includes a communication network 12. The communication network 12, in this example embodiment, is an essentially wireless cellular telephonic communication network based on the Global System of Mobile (GSM) communication standard, Code-Division Multiple Access (CDMA) standard, or the like. However, any mobile communication technology, including Third Generation (3G), and further developed mobile communication technologies can be employed in other embodiments of the invention.

The communication system 10 also includes a cellular telephone 14 which is able to receive and make telephone calls via the network 12. The telephone 14 also has a broadcast receiver arrangement which includes broadcast reception equipment whereby broadcast programs can be reproduced on the cellular telephone 14 for enjoyment of the user.

The system 10 further includes radio broadcasters 16, 18. In this example they are respectively a commercial radio broadcaster 16 and a commercial television broadcaster 18. It will be appreciated by a person ordinarily skilled in the art that broadcasters 16, 18 can deploy any broadcasting technology, including analog and/or digital broadcasting technologies with, the broadcast receiver arrangement of the cellular telephone 14 having equivalent technology. Accordingly, the invention is in no way limited to any specific broadcasting technology even though reference may be made to a specific broadcasting technology elsewhere in the description of example embodiments.

The system 10 includes further a geostationary satellite 15 for broadcasting programs such as commercial television programs and movies, the cellular telephone 14 also being capable of receiving and reproducing these programs.

It is known for a mobile communication terminal device, such as the cellular telephone 14, to have an integrated broadcast program reception module for receiving broadcasts such as a radio program or a television program which are reproducible audible and/or visually, as the case may be, on the cellular telephone 14. In such case, the cellular telephone 14 serves a dual purpose, on the one hand, the cellular telephone 14 is employed for telephonic communication, and on the other hand the cellular telephone 14 is employed for reproduction of the relevant broadcasts.

Accordingly, from time-to-time, a user may want to use the cellular telephone 14 as a telephonic communication device when a radio or television program, which the user wants to listen to or watch, is being broadcast. Also, the user may be listening to or watching a program using the cellular telephone 14, when an incoming telephone call is received. Further, a user may want to watch or listen to a particular radio or television program or a radio or television program having content of interest of the user, and a user would like to be alerted when said radio or television program is broadcast.

Figure 2:
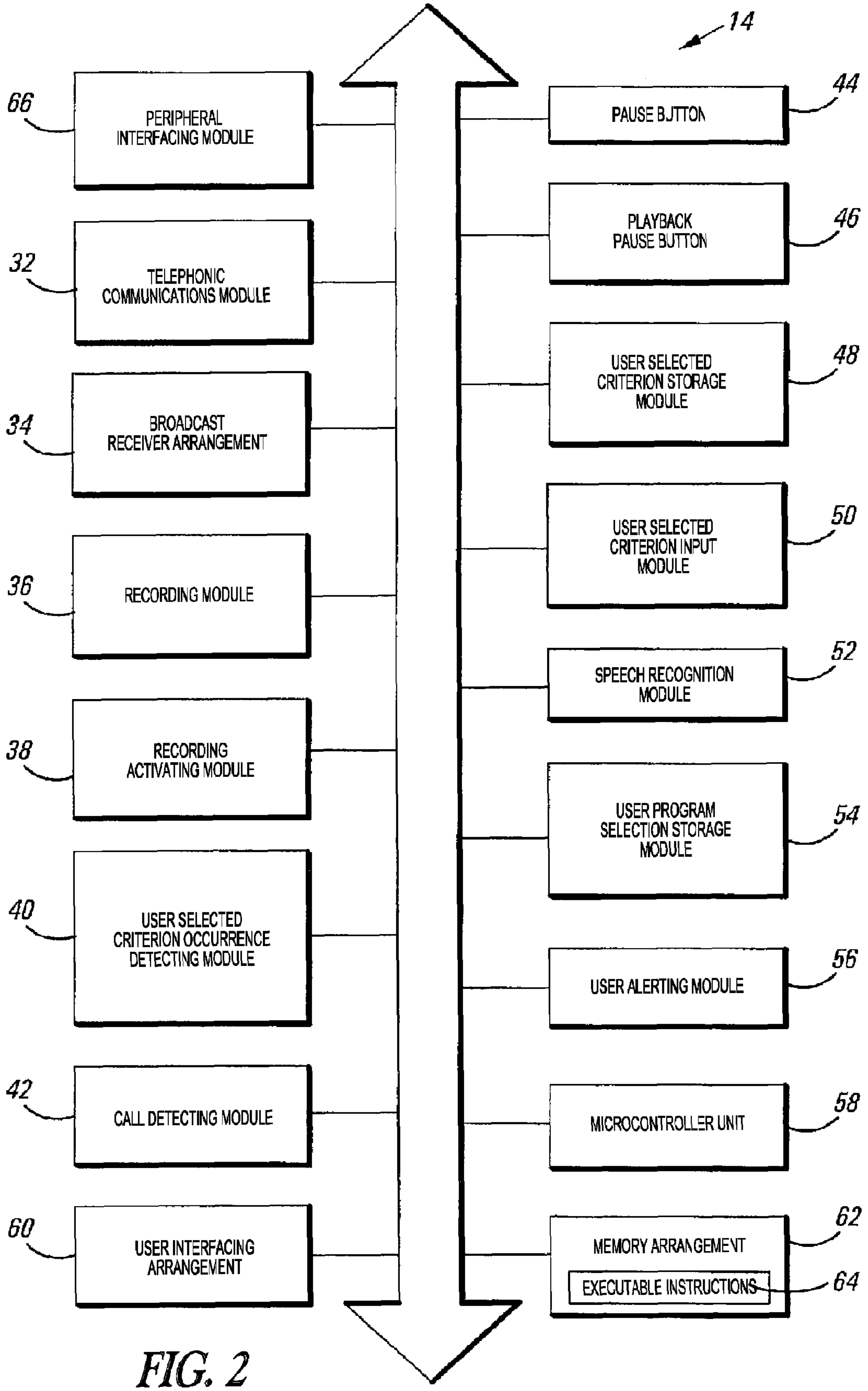
FIG. 2 shows a simplified functional block diagram of the integrated communication and broadcast reproduction device, in accordance with an example embodiment, forming part of the communication system in FIG. 1.

Referring to FIG. 2, a simplified schematic functional block diagram of an integrated mobile communication and broadcast program reproduction device which is in the form of the cellular telephone 14, is shown. The cellular telephone 14 includes a telephonic communication module 32 to establish a telephonic connection with the cellular communication network 12. A broadcast receiver arrangement 34 also forms part of the cellular telephone 14 to receive a transmitted broadcast program signal from an associated broadcaster 16, 18. The broadcast receiver arrangement 34 is configured for receiving a broadcast from one of an analog radio broadcast, a digital radio broadcast, an analog television broadcast, a digital television broadcast, an analog movie broadcast and a digital movie broadcast.

The cellular telephone 14 also includes a recording module 36 to record at least a part of the received broadcast program signal in response to a trigger event, and a recording activating module 38 for activating the recording module 36 in response to the trigger event to record a predetermined broadcast program. As will appear from the further description below, a trigger event includes an incoming telephone call, an outgoing telephone call, identification of predetermined content in the received broadcast program signal and the provision of a programming start indicator which indicates that a predetermined program has commenced or is about to commence.

The recording activating module 38 is, in one embodiment, responsive to a user of the device, as is described in more detail below. Further, the cellular telephone 14 includes a user selected criterion occurrence detecting module 40 for detecting the occurrence of a user selected criterion in the received broadcast program, the recording activating module 38 being automatically operable by the user selected criterion occurrence detecting module 40.

The cellular telephone 14 includes an incoming call detecting module 42 for detecting a trigger event in the form of an incoming telephone call. A pause button 44 is provided for the cellular telephone 14 to pause reproduction of a broadcast upon detecting an incoming or an outgoing telephone call. Similarly, a playback pause button 46 to pause and then playback the broadcast program in response to reception and termination of a telephone call respectively, is provided for the cellular telephone 14.

Moreover, the cellular telephone 14 includes a user selected criterion storage module 48 for storing a user selected criterion and a user selected criterion input module 50 for inputting the user selected criterion into the storage module 48. Detection of the user selected criterion occurring in a broadcast program may define the trigger event. As is explained below, the user selected criterion is at least one word and the user selected criterion occurrence detecting module 40 includes a speech recognition module 52 for recognizing the presence of the at least one word in the broadcast program. In addition or instead, the trigger event may be derived from envelope information of a broadcast program signal.

To this end, a user program selection storage module 54 forms part of the cellular telephone 14 for selecting a broadcast program to be recorded, which program details are employed for detecting the broadcast program and for activating the activating module 38, detecting the broadcast program defining the trigger event. Program details of the selected program may include a start time, end time, date and channel, and the details are stored, in use, in the user program selection storage module 54.

The cellular telephone optionally includes also a user alerting module 56 for alerting a user that recording of a broadcast program has commenced.

The cellular telephone 14 includes further a microcontroller unit 58, and a user interfacing arrangement 60 for entering a user selected criterion into the cellular telephone 14, and an optional peripheral interfacing module 66 for interfacing with peripheral devices, such as a removable digital storage device, and the like, the functions of which are explained in more detail below, as it relates to the methodology of the invention.

The cellular telephone 14 may include also an onboard memory arrangement 62 which typically comprises program and data memory for storing a set of processor executable instructions 64, which when executed by the microcontroller unit 58, performs functions of the cellular telephone 14 in accordance with the methodology of the invention.

Figure 3:
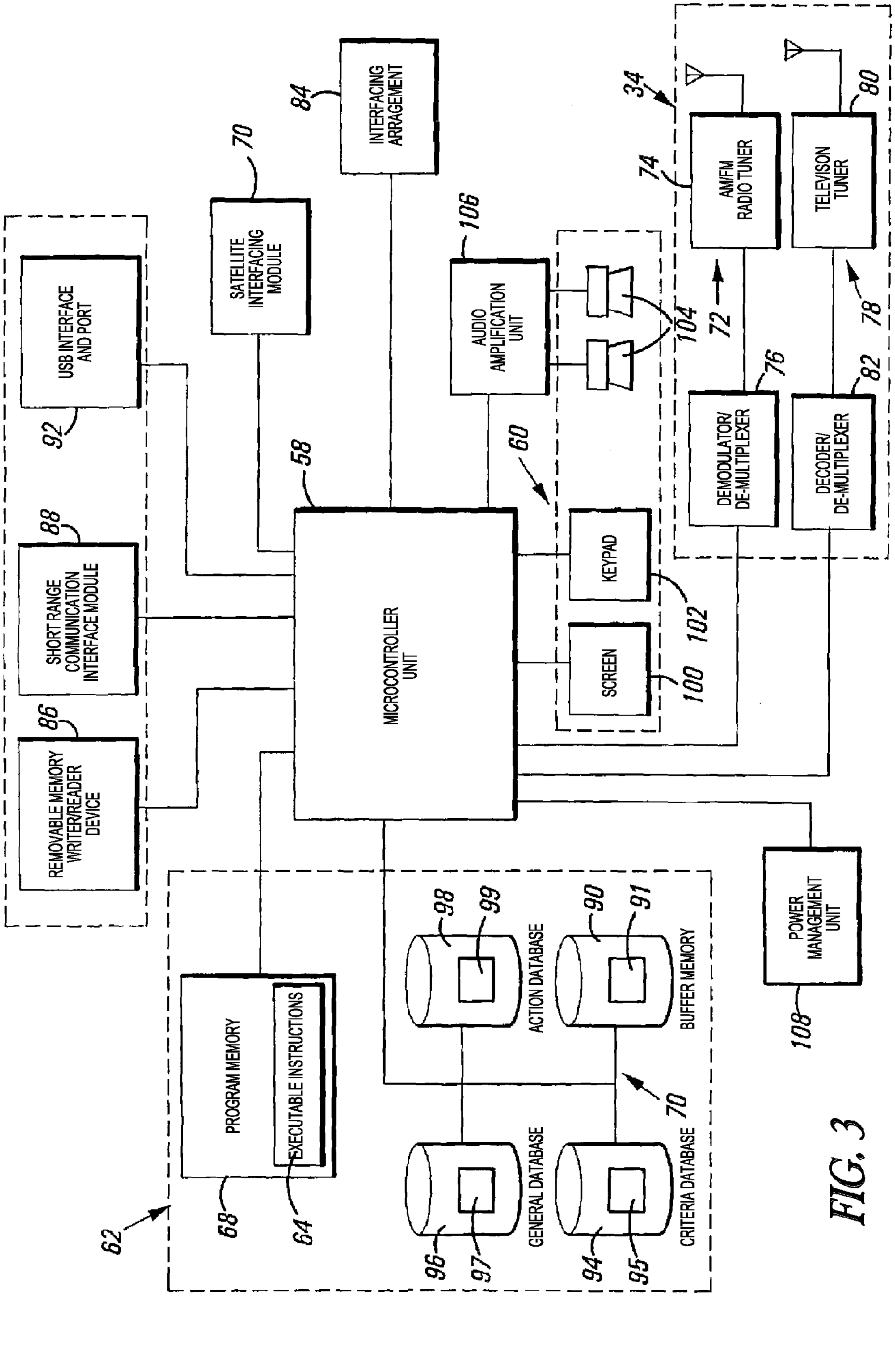
FIG. 3 shows, in more detail, a schematic functional block diagram of the integrated communication and broadcast reproduction device, in accordance with an example embodiment, of FIG. 2.

Referring to FIG. 3, an example schematic functional block diagram of the cellular telephone 14 in FIG. 2 is shown, in more detail. The telephonic communication module 32 includes a cellular telephonic communication interfacing arrangement 84 to establish a telephonic connection with the cellular communication network 12. The broadcast receiver arrangement 34 includes, in this example embodiment, two broadcast receiving modules, namely a radio broadcast receiving module 72 comprising a FM/AM radio tuner 74 and a demodulator/de-multiplexer 76, and a television broadcast receiving module 78 comprising a television tuner 80 and a decoder/de-multiplexer 82. The cellular telephone 14 further includes a satellite interfacing module 70 for direct satellite communication from the satellite 15. These receiving modules 70, 72, 78, are configured for receiving digital- and/or analog broadcasts and their associated broadcast envelops of program information if available from the broadcasters 16, 18. Thus, the broadcast receiver arrangement 34 is configured for receiving a broadcast from one of an analog radio broadcast, a digital radio broadcast, an analog television broadcast, a digital television broadcast, an analog movie broadcast and a digital movie broadcast. In an embodiment, multiple tuners of the same kind may be provided in the telephony device in order to enable monitoring and/or recording multiple channels at the same time. Thus, in an example embodiment, the cellular telephone 14 may tune in, monitor, and record multiple programs simultaneously.

The recording module 36 optionally includes a removable memory writer/reader device 86 such as a Secure Digital (SD) memory drive for writing to and reading from a SD card. Instead, the memory writer/reader device 86 can be a Multimedia Memory Card (MMC) drive for receiving a MMC card. The recording module 36 also includes a buffer memory 90 which is defined by the onboard data memory 70, for recording at least a part of the received broadcast program signal in response to a trigger event. It will however be appreciated that SD and MMC cards are merely examples and that any other removable media drive may be utilized.

The peripheral interface module 66 includes a short range communication interface module 88 for example to permit Infrared and Bluetooth communication between the cellular telephone 14 and a personal computer for permitting a user to download a broadcast program recording to the personal computer from the cellular telephone 14, if so desired. Further, the peripheral interface module 66 also includes a Universal Serial Bus (USB) interface and port 92

The Adaptive Speech Recognition (ASR) module 52 (see FIG. 2) receives as its input an audio content, for recognising speech from the audio content, and for producing as its output a transcription of the recognised speech. The function of the ASRM as part of this example embodiment for activating the recording module 36 in response to the trigger event to record a predetermined broadcast program is described below.

The user selected criterion storage module 48 includes a criteria database 94 for storing the user selected criterion. As is explained below, the user selected criterion is at least one word and the user selected criterion occurrence detecting module 40 includes the speech recognition module 52 for recognizing the presence of the at least one word in the broadcast. The user program selection storage module 54 includes a program storage database 96 for storing details of a selected broadcast program.

The cellular telephone optionally includes also a user alerting module 56 for alerting a user that recording of a broadcast program has commenced.

The microcontroller unit 58 includes a microprocessor comprising a digital baseband processor and an analog baseband processor, and associated controlling modules, herein after together referred to as the microcontroller unit 58 for ease of description.

The onboard memory arrangement 62 includes a program memory 68 for storing a set of processor executable instructions 64 which, when executed by the microcontroller 58, performs any one of the methodologies of the invention, and a data memory 70 for temporary and/or permanent storage of data. The data memory 70 includes a general data space 96, and a data space defining the user criteria database 94, an internal recording buffer 90, and a predetermined- and alternative action database 98, respectively for storing, general data 97, user selected criteria 95, media contents of a broadcast 91, and a predetermined- or alternative action 99 which is to be performed by the cellular telephone 14 when a radio or television program in which a user is interested is identified.

In conventional fashion, the user interface arrangement 60 includes a display in the form of a Liquid Crystal Display (LCD) screen 100, an alphanumeric keypad 102, and an audible sound output device having two loudspeakers 104. An audio amplification unit 106 forms part of the cellular telephone 14, the loudspeakers 104 being electrically connected to the audio amplification unit 106, operatively able also to output a stereo format audible sound.

A power source and power management unit 108 forms part of the cellular telephone 14 for supplying regulated electrical power to electrical components of the cellular telephone 14.

It will be appreciated that the methodology is performed when the set of processor readable instructions 64, stored on a data carrier, is executed by the microcontroller unit 58. Execution of the set of instructions 64 thus forms applications, the functional steps of which are in accordance with any methodology described herein, which functional steps are described by way of example below.

Figure 4:
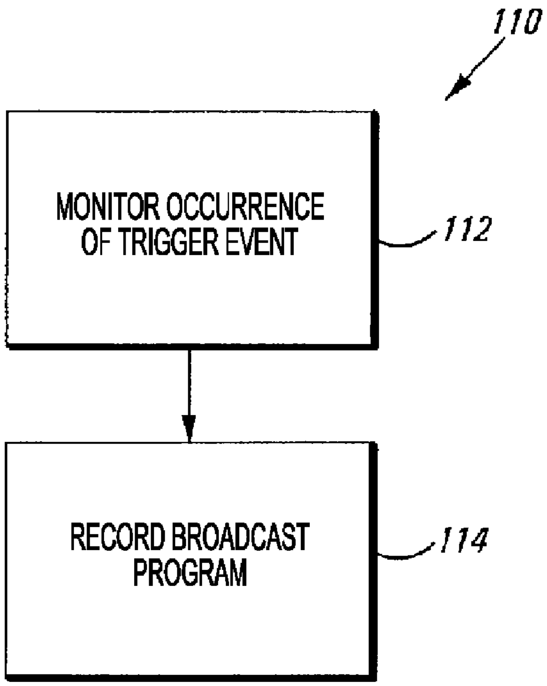
FIG. 4 shows a block flow diagram of method for controlling an integrated communication and broadcast program reproduction device, in accordance with an example method.

Broadly, in accordance with the methodology, FIG. 4 shows a flow diagram, generally indicated by reference numeral 110, for controlling operation of an integrated mobile communication and broadcast program reproduction device such as the cellular telephone 14. The method includes monitoring, at block 112, an occurrence of a trigger event at the device. Monitoring the occurrence of a trigger event includes monitoring a received broadcast program for an occurrence of a user selected criterion. In such case, the user selected criterion is a word and the occurrence of the word is detected using speech recognition techniques to detect the presence of the word in an audio component of the received broadcast program In addition, the broadcast program is identified by selecting a broadcast program to be recorded with a selection storage module, and storing details of the selected program for identifying the selected broadcast program, identification of the selected broadcast program defining the trigger event. The details of the selected program are selected from the group comprising a start time, end time, date and channel, and the details are stored, in use, in the user program selection storage module.

Instead, a reproduction of the broadcast program on the cellular telephone may already be in progress, in which case, the trigger event can include detecting an incoming call or an outgoing call.

The method further includes, upon detection of the trigger event, recording, at block 114, a broadcast program received by the cellular telephone. In addition, other actions can be performed by the cellular telephone 14 upon detection of the trigger event, such as alerting a user of commencement of the broadcast program. The method additionally includes ceasing to monitor the occurrence of a further trigger event once a trigger event has been detected and the broadcast program signal is being recorded. Actions such as alerting a user and recording a broadcast program is hereinafter referred to as predetermined actions.

Accordingly, the method 110 includes, identifying, at block 115, an occurrence of a user selected criterion in a broadcast program, identifying, at block 116, a predetermined action associated with the user selected criteria, and performing, at block 117, the predetermined action associated with the user selected criteria when the broadcast program which meets the user selected criteria is identified.

Figure 6:
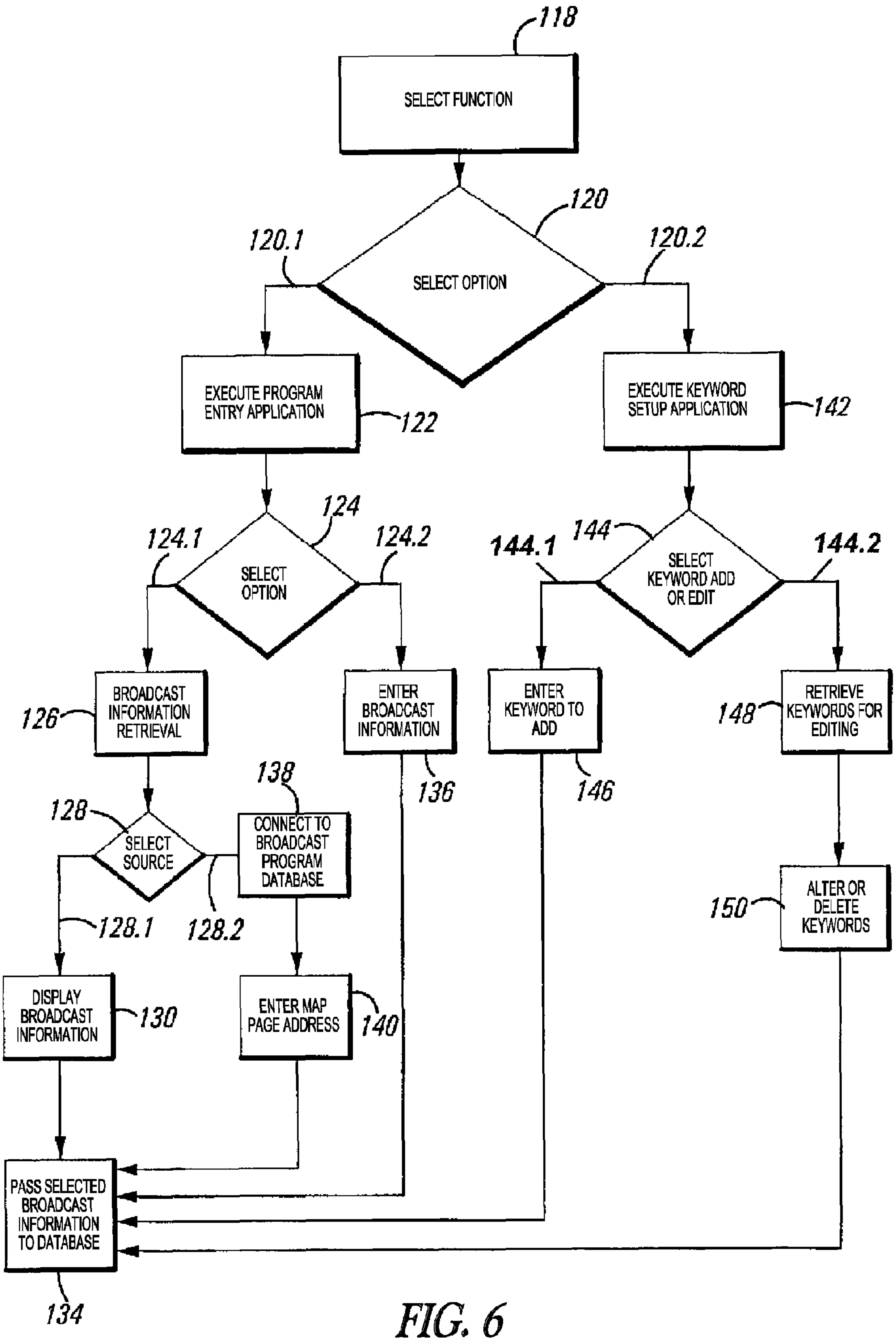
FIG. 6 shows a functional block flow diagram of part of the method in FIG. 4.

The method includes populating the user criteria database 94 with a user selected criterion 95 by entering the user criterion into the cellular telephone 14. Two types of user selected criteria 95 can be entered into the user criteria database 94, namely keywords and program entries. Accordingly, with reference to FIG. 6, the user selects, at block 118, a function on the cellular telephone 14, which prompts, at block 120, the user either to select a keyword option, or a program entry option, the keyword option permitting a user to enter keywords which are used to identify a radio or television program in which the user is interested, and the program entry option permitting a user to enter a broadcast channel and a scheduled starting time of a radio or television program in which the user is interested.

If a user selects, at block 120, the program entry option, then branch 120.1 is followed, and a program entry application is executed, at block 122, on the cellular telephone 14, which prompts, at block 124, the user to select between a program information retrieve option for accessing over the Internet program information, such as broadcasting channels and program broadcast schedules, or a program information enter option for entering a broadcast channel and scheduled program starting time in the case of the user already knowing these program information.

If a user selects the retrieve program information option, at block 124, then branch 124.1 is followed, and a broadcast information retrieving application executes, at block 126, which prompts, at block 128, the user to select a source of broadcast information from which a user desires to retrieve broadcast program information. In this example embodiment, the user is prompted, at block 128, to select a broadcast envelope option, the broadcast envelope including broadcast program information which is broadcast and readily available for broadcast information program retrieval, or to select a broadcast database option for retrieving program information from a broadcast database, which database is accessible over the Internet, if the telephone 14 is Internet enabled. If a user selects, at block 128, the broadcast envelope option, then the associated broadcast reception module, radio or television broadcast reception module 72, 78, as the case may be, receives the broadcast envelope of program information, and the microcontroller 58 retrieves the program information from the received broadcast envelope, renders it into a readable text format which is displayed, at block 130, on the LCD 102, so that a user can browse through the broadcast program information. The broadcast program information which is retrieved from the broadcast envelope typically includes program titles, program schedule starting times, and program content descriptions of the respective programs which are still to follow.

A user then browses through the displayed broadcast information using the keypad 100 and selects a broadcast program in which the user is interested. On selection of the broadcast program, the selected broadcast channel and program starting time is passed, at block 132, as a program entry 95 to the user criteria database 94 operable for the processing arrangement automatically to identify the broadcast program in which the user is interested.

For example, with an Internet enabled telephone 14, if a user selects, at block 128, the broadcast database option, then branch 128.2 is followed, and a connection over the data communication network 12 (e.g., by way of GPRS) is established, at block 138, between the cellular telephone 14 and a broadcast program database 17, 19. The user enters, at block 140, a WAP page address of the broadcast program database, so that the broadcast program information for the specific broadcaster is retrieved from the broadcast program database 17, 19, and displayed on the LCD 102. Similarly as above, the user scrolls or browses through the displayed broadcast program information using the keypad 100 and selects a broadcast program in which the user is interested. On selection of the broadcast program, the broadcast channel and scheduled program starting time is passed, at block 132, as a program entry 95 to the user criteria database 94 operable for the microcontroller unit 58 to identify the broadcast program in which the user is interested.

Instead, if a user selects the enter program information option, at block 124, then branch 124.2 is followed, and a user is prompted, at block 136, to enter the broadcast channel and the scheduled program starting time information, which in turn, is passed, at block 134, as a program entry 95 to the user criteria database 94 operable for the processing arrangement 32 to identify the broadcast program in which the user is interested.

If a user, at block 120, selects the keyword option, then branch 120.2 is followed, and a keyword setup application executes, at block 142, which prompts, at block 144, a user to select between an add keyword option and an edit keyword option. If a user selects the add keyword option, at block 144, then branch 144.1 is followed, and a user enters, at block 146, a keyword which relates to an interest of the user with the keypad 100 into the cellular telephone 14. The keyword is in the form of an alpha- or alphanumeric text string which is descriptive of an interest of the user. "Keyword" is meant to include singular words and word phrases. For example, the user enters the word "baseball" which is a sport in which the user is interested. The keyword is then passed, at block 134, to the user criteria database 94 operable for the microcontroller unit 58 automatically to identify a broadcast program in which the user is interested, by monitoring broadcasts as is explained hereunder.

If a user selects the edit keyword option, at block 144, then branch 144.2 is followed, and the keywords 95 which are stored on the user criteria database 94 is retrieved, at block 148, and displayed on the LCD 102. The user then uses the keypad 100 to alter or delete, at block 150, the keywords 95 previously stored on the user criteria database 94, after completion of which the alterations is passed, at block 134, to the user criteria database 94 operable for the microcontroller unit 58 to identify a broadcast program in which the user is interested, by monitoring broadcast programs as is explained hereunder.

Figure 5:
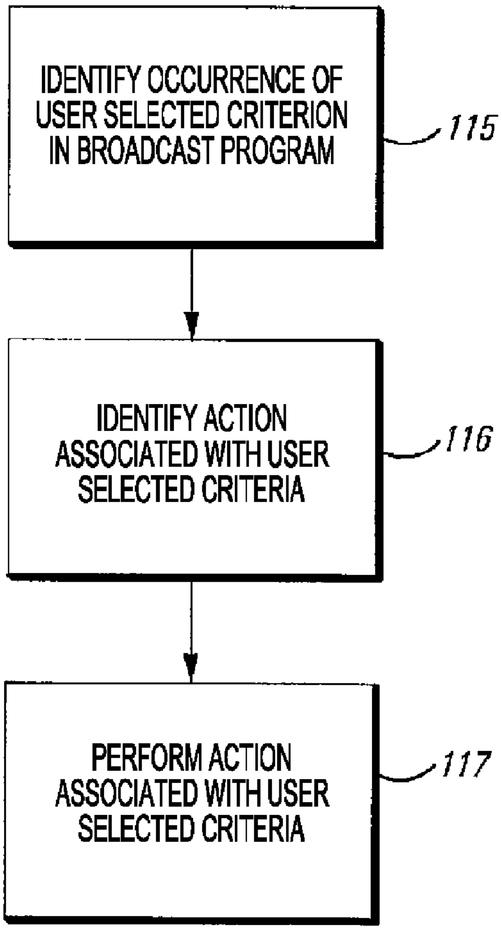
FIG. 5 shows a functional block flow diagram of part of the method in FIG. 4.
Figure 7:
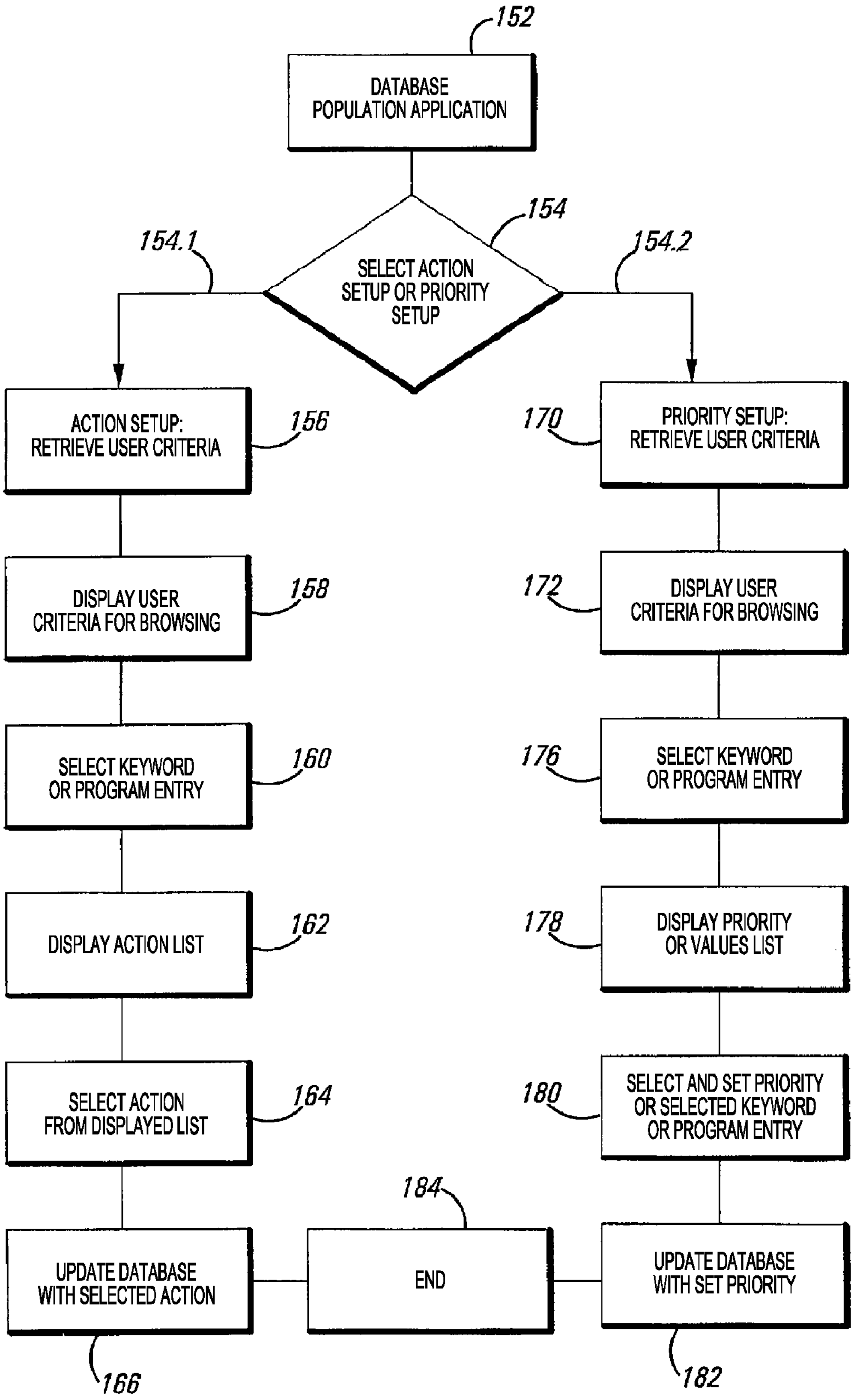
FIG. 7 shows a functional block flow diagram of part of the method in FIG. 4.

Referring to FIG. 7, identifying a predetermined action associated with the user selected criteria, at block 116 of FIG. 5, includes populating a predetermined action database 98 with at least one predetermined action 99, which predetermined action 99 is to be performed when the broadcast program in which the user is interested is identified. The predetermined action database may be populated by executing, at block 152, a database population application, after which a user is prompted, at block 154, to select between a action setup option for selecting one or more actions from a list of predetermined actions which is to be performed when the program of interest to the user is identified, and a priority setup option for prioritising the user criteria selectively to perform the predetermined actions associated with keywords having a higher priority, rather than the predetermined actions pertaining to keywords having a lower priority.

If a user selects the action setup option, then branch 154.1 is followed and the user criteria 95 (keyword and program entry) which are available on the user criteria database 94 is retrieved, at block 156, by the microcontroller 58 and displayed on the LCD 102 of the cellular telephone 14, at block 158, so that a user can browse with the keypad 102 through the stored user criteria.

To this end, the user criteria 95 includes the keywords which are to be used for automatically identifying a radio or television program in which the user is interested, and the program entries comprising their respective program channels and the scheduled starting times. A user selects, at block 160, a keyword or a program entry, on selection of which the user is prompted, at block 162, with a list of predetermined actions which is displayed on the LCD 102. In this embodiment of the invention, the list of predetermined actions may comprise: i) alert user of identified broadcast, which when selected merely alerts the user of said identified broadcast and waits for the user to take any further action; ii) alert user and record, which when selected alerts the user of said identified broadcast and automatically starts recording the identified broadcast; and iii) alert user and reproduce, which when selected alerts the user and automatically starts reproducing the identified broadcast program on the cellular telephone 14. As is explained hereunder, alternative predetermined actions are also performed in association with keyword and program entries 95.

A user selects, at block 164, a particular action 99 from the list of predetermined actions, which particular action 99 is then associated with the selected keyword or program entry 95, as the case may be, and the predetermined action database is updated, at block 166, with the particular predetermined action 99, so that when the user criteria 95 is met, e.g. when a radio or television program of interest to the user is identified, the microcontroller 58 can query the predetermined action database 98 to determine which action is to be performed in association with the relevant keyword or program entry 95.

Instead, if a user selects, at block 154, the priority setup option, then branch 190.2 is followed, and the user selected criteria 95 which is stored on the user criteria database 94 is retrieved, at block 170, and displayed, at block 172, on the LCD 102, so that the user can browse through it with the keypad 100. A user selects, at block 176, a keyword or program entry, on selection of which a list of priority values is displayed, at block 178, on the LCD 102. In this example embodiment, the list of priority values includes two priority values, indicated with the numerals "1" and "2" respectively, one being the highest priority, and two being the lowest priority. It will be appreciated that more priority values than two can be employed, however, for easy of illustration, only two priority settings are used in this embodiment.

For example, the entered user criteria 95 may comprise the keyword "baseball", and the entered program entry, TV channel 3, 16:00, which is a broadcast program about "history of man". A user is interested in topics, "baseball" and "history of man", but, the user prefers "baseball" over "history of man". Thus, in the instance when the broadcast program on TV channel 3 starts at 16:00, and the cellular telephone 14 automatically detects another broadcast program which relates to "baseball", then a user would prefer rather to reproduce the "baseball" program than the "history of man" program. Accordingly, the user sets the keyword "baseball" to a priority "1", and the program entry for "history of man" to priority "2". Thus, should the scenario occur where two broadcasts of interest to the user are broadcast and identified in overlapping times slots, then the priority setting determines which predetermined action is to be performed, in this case, the predetermined action associated with the baseball program is performed, as is has associated with it the higher priority. It will however be appreciated that in other embodiments more than one broadcast program may be recorded simultaneously using multiple tuners.

A user selects and sets, at block 180, a priority of the selected keywords or program entry 95, which priority is then associated with the selected keyword or program entry 95, as the case may be, and the user criteria database 94 is updated, at block 182, with the set priority, so that when the broadcast of interest to the user is detected or identified, the microcontroller unit 58 can query the criteria database 94 to determine a priority of the keyword or the program entry 95.

After completion of the action setup and priority setup as explained above, the cellular telephone 14 is activated to monitor the broadcasts so that the predetermined actions can be taken when a broadcast which is of interest to the user is automatically identified.

Figure 8:
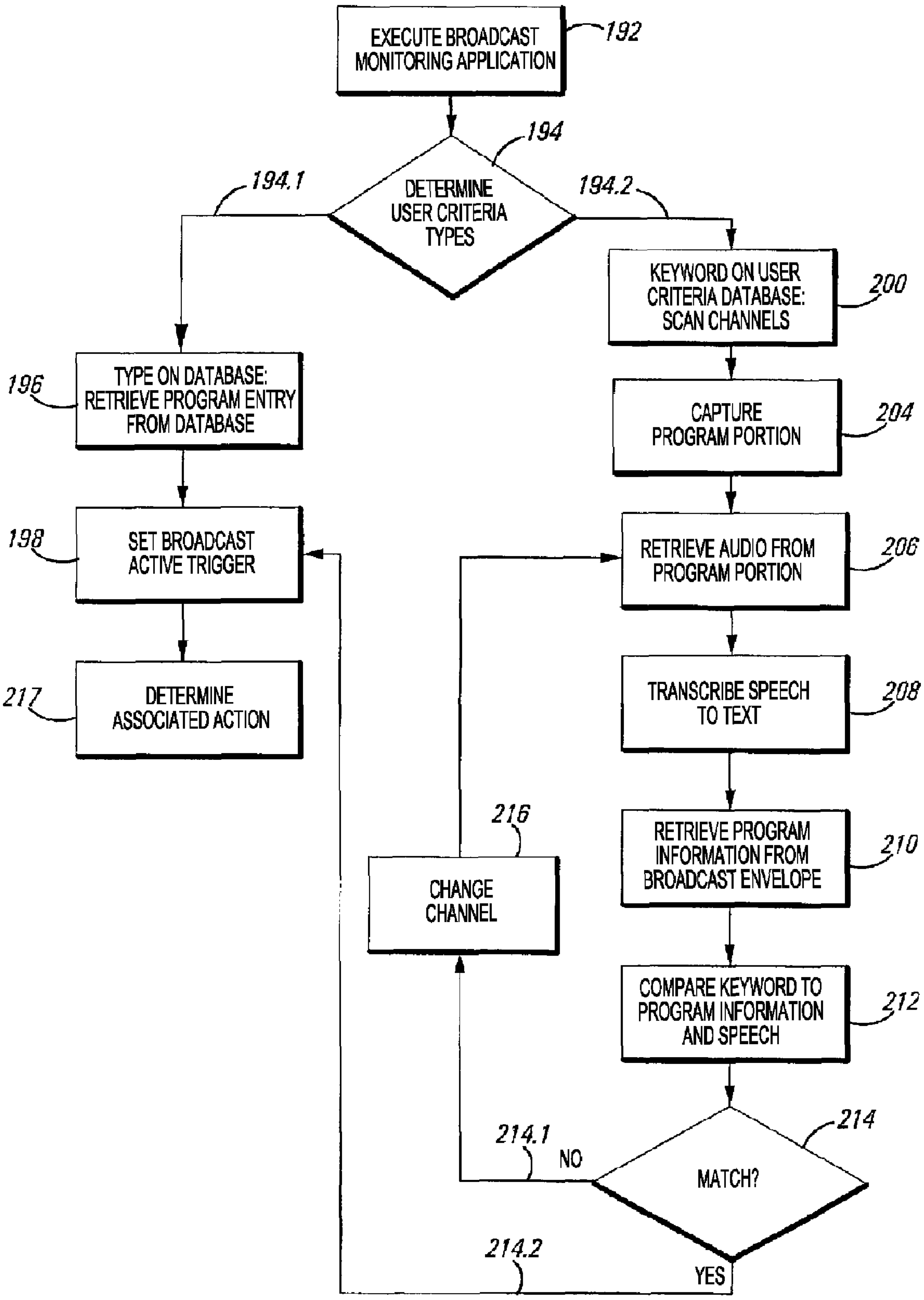
FIG. 8 shows a functional block flow diagram of part of the method in FIG. 4.

FIG. 8 shows a flow diagram of performing the predetermined action, at block 117 of FIG. 5, when the broadcasts (radio or television program) in which the user is interested are identified.

Keeping in mind that two types of user selected criteria 95, namely a keyword and a program entry, are stored on the user criteria database 94, it will be appreciated that different procedures, or embodiments in accordance with the methodologies, are employed for utilising the two types of user selected criteria 95 to identify a broadcast program in which the user is interested. Thus, at block 192, a broadcast monitoring application executes on the cellular telephone 14, for determining, at block 194, the types of user criteria 95 which are stored on the criteria database 94 to initiate or execute associated procedures.

If a program entry is detected, at block 194, as one type of user selected criteria 95 which is available on the user criteria database 94, then branch 194.1 is followed, and the program entry, in particular the broadcast channel and the scheduled program starting time, are retrieved, at block 196, by the microcontroller 58 from the user criteria database 94, and temporarily stored in the general data memory 96 for use with an interrupt handle which sets a broadcast active trigger, at block 198, as soon as the scheduled program starting time is met.

If a keyword is detected as available on the user criteria database 94, at block 194, then branch 194.2 may be followed, and the microcontroller 58 controls the tuner modules 72, 78 sequentially to scan, at block 200, through available broadcast channels. The microcontroller 58 controls the tuner modules 72, 78 in such a way that it stays for a predetermined period of time tuned to one channel, and then jumps to a next channel. During its stay at one channel, a portion of the radio or television program is captured and temporarily stored, at block 204, on, for example, the internal recording buffer 90.

An audio content of the temporarily stored program is then retrieved, at block 206, form the temporarily stored program portion, and may be passed to the ASR module, which in turn, performs, at block 208, speech recognition on the audio content and transcribes the speech into text related data which is also temporarily stored in the data memory 70. Further, program information from the broadcast envelope of the program is retrieved, at block 210, and temporarily stored in the data memory 51. It will be appreciated that if a selected keyword is stored in the audio domain then ASR functionality may not be required.

At block 212, the keywords are compared to the temporarily stored speech content and program information, to determine, at block 214, whether or not any of the retrieved speech and program information matches any of the keywords in the user criteria database 94.

If a match is not found, then branch 214.1 is followed and the microcontroller 58 switches, at block 216, the broadcast tuner modules 72 or 78 to another channel and the scanning process starts again, at block 206.

Instead, if a keyword match is found, at block 214, then branch 214.2 is followed, to block 198 at which the broadcast identified trigger is activated.

At this stage, when the broadcast identified trigger is set, at block 198, either by way of a program entry time match or a keyword match, and the predetermined action which is associated with the match is to be performed, the microcontroller 58 interrogates the predetermined action database 98, at block 217, to determine the particular predetermined action 99 which is associated with the keywords or program entry 95, as the case may be, with which a match was found.

In this example embodiment, any one of three example predetermined actions can be associated with the keyword with which a match was found, namely: i) alert the user of the identified broadcast, which when selected merely alerts the user of said identified broadcast and waits for the user to take any further action; ii) alert the user and record, which when selected alerts the user of said identified broadcast and automatically starts recording the identified broadcast; and iii) alert the user and reproduce, which when selected alerts the user and automatically starts reproducing the identified broadcast program on the cellular telephone 14.

Figure 9:
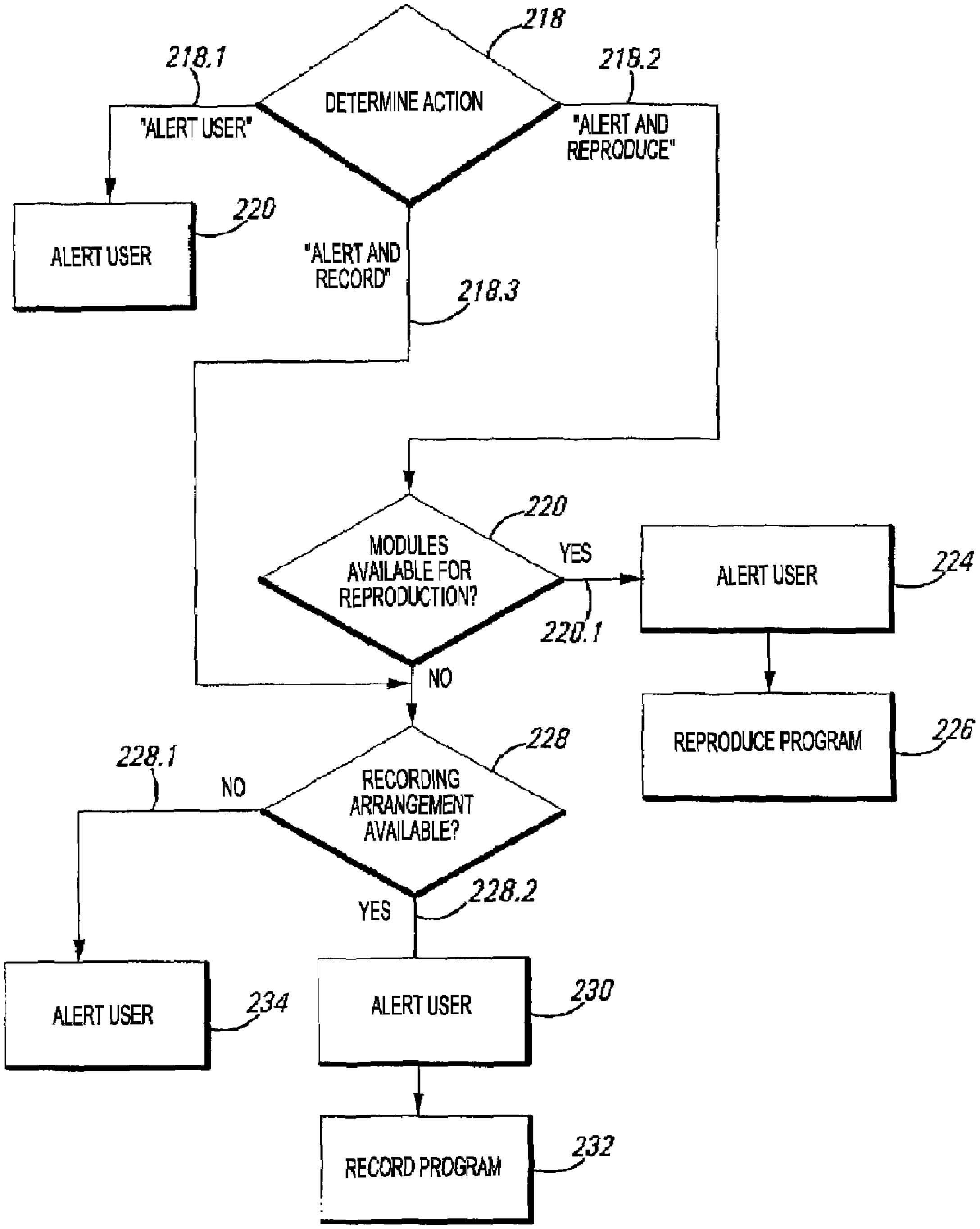
FIG. 9 shows a functional block flow diagram of part of the method in FIG. 4.

In FIG. 9, if the particular predetermined action is identified, at block 218, as "alert user", then branch 218.1 is followed and the user is alerted, at block 220, that the radio or television program has been identified. The user is alerted by, for example, sounding an audible alarm and/or displaying a soft button, such as a pause or pause/playback button, on the LCD screen 102.

Otherwise, if the particular predetermined action is identified, at block 218, as "alert user and reproduce", then branch 218.2 is followed to determine, at block 220, whether or not the modules, such as the LCD screen 102 and loudspeakers 104, are free (not in use) for reproduction of the identified radio or television program on the cellular telephone 14. If the relevant modules are available for reproduction of the radio or television program, then branch 220.1 is followed to alert, at block 224, the user of the identified radio or television program, and, the radio or television program is automatically reproduced, at block 226, on the cellular telephone. Instead, if it is determined, at block 220, that the relevant reproduction modules are in use, then an alternative predetermined action is performed. In this example, the alternative action is to record the identified radio or television program, thus, availability of the recording arrangement is determined, at block 228. In this example embodiment, the recording arrangement includes the SD drive and SD card or the internal buffer, thus either of them is used to record the identified radio or television program. If either of the SD drive or the internal buffer is available, then the user is alerted, at block 230, and recording commences, at block 232, of the identified radio or television program. At block 228, if the recording arrangement is not available for recording, the user is alerted, at block 234, of the identified radio, or television program.

If, at block 218, the predetermined action is identified as "alert and record", then branch 218.3 is followed, and, similarly as above, it is determined at block 228, whether or not the recording arrangement is available for recording the identified radio or television program. If either of the SD drive 102 or the internal buffer 90 is available, then the user is alerted, at block 230, and recording commences, at block 232, of the identified radio or television program. At block 228, if the recording arrangement is not available for recording, the user is alerted, at block 234, of the identified radio, or television program.

Figure 10:
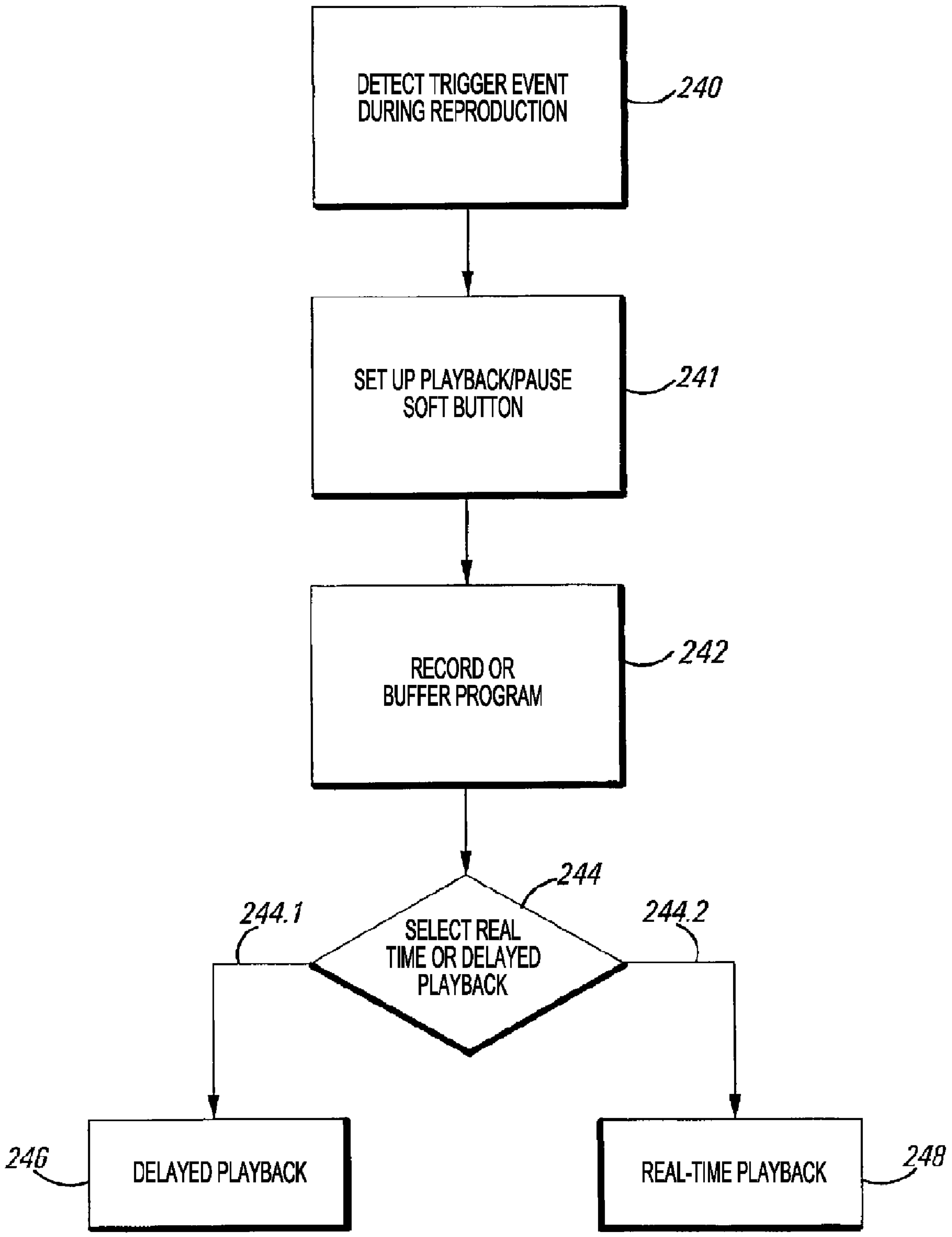
FIG. 10 shows a functional block flow diagram of part of the method in FIG. 4.

Further, a scenario may occur that a user needs to perform a function with the cellular telephone 14, such as requesting or receiving a telephone call, or executing an available application on the cellular telephone 14, such as consulting a diary application, in which case, conveniently, a user would wish temporarily to interrupt the radio or television program which is being reproduced on the cellular telephone 14, and to resume reproduction thereof later, without missing the portion of the radio or telephone program which was broadcast during the interruption. Accordingly, in accordance with the methodology, with reference to FIG. 10, the cellular telephone 14, while reproducing a radio or telephone program, detects, at block 240, a trigger event in the form of an incoming or outgoing call, and receives an interruption request from the user by setting up a playback/pause soft button, at block 241. The user depresses the pause button, and the reproduction of the radio or television program on the cellular telephone 14 terminates temporarily and recording or buffering of the relevant program commences, at block 242.

After termination of the relevant application or telephone call, a user selects, at block 244, either to resume reproduction of the radio or television program in real time, or to resume reproduction in delayed time. If a user selects the delayed time option, then branch 244.1 is followed, and the recorded portion 91 of the program is played back from the point when the reproduction was interrupted by retrieving the recorded portion 91 from buffer 90, while the remaining broadcast is continuously buffered or recorded, so that, in effect, a delayed reproduction of the radio or television program is performed on the cellular telephone 14. Instead, if a user selects the resume real-time option, then the recording is terminated, at block 248, and reproduction commences in real time, in which case a user can later retrieve the recorded program portion 91 from the recording memory 90, if so desired.

Although example embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for controlling operation of a mobile device, the method including:
- receiving a broadcast program signal;
- monitoring an occurrence of a trigger event at the mobile device;
- detecting the trigger event from envelope information of the broadcast program signal;
- upon occurrence of the trigger event, recording the broadcast program signal received by the mobile device, wherein the device operates as an integrated mobile communication and broadcast program reproduction device; and
- ceasing to monitor the occurrence of a further trigger event once the trigger event has been detected and the broadcast program signal is being recorded.

2. The method as claimed in claim 1, in which detecting the trigger event includes identification of predetermined content in the received signal.

3. The method as claimed in claim 2, which includes prompting entering of the predetermined content.

4. The method as claimed in claim 1, in which detecting the trigger event includes provision of a programming start indicator.

5. The method as claimed in claim 1, in which recording of the broadcast program signal occurs after manual intervention by a user of the device.

6. The method as claimed in claim 1, in which recording of the broadcast program signal occurs automatically.

7. The method as claimed in claim 1, which includes reproducing the recorded broadcast program.

8. The method as claimed in claim 7, which includes prompting pausing of reproduction of a broadcast program upon detection of a trigger event.

9. The method as claimed in claim 1, which includes continuing to record the broadcast program while reproducing part of the broadcast program previously recorded.

10. The method as claimed in claim 1, which includes alerting a user that recording of a broadcast program has commenced.

11. The method as claimed in claim 1, which includes establishing a telephonic connection between the device and a cellular communication network.

12. The method as claimed in claim 1, in which the broadcast program is selected from an analog radio broadcast, a digital radio broadcast, an analog television broadcast, a digital television broadcast, an analog movie broadcast and a digital movie broadcast.

13. A memory arrangement embodying instructions which, when executed by a mobile device, cause the device to:
- receive a broadcast program signal;
- monitor an occurrence of a trigger event at the mobile device;
- upon occurrence of the trigger event, record the broadcast program signal received by the mobile device, wherein the device operates as an integrated mobile communication and broadcast program reproduction device; and ceasing to monitor the occurrence of a further trigger event once the trigger event has been detected and the broadcast program signal is being recorded.

14. An integrated mobile communication and broadcast program reproduction device which includes:

a connecting means for establishing a telephonic connection between the device and a cellular communication network;

a receiver for receiving a broadcast program signal;

a recording module for recording the broadcast program signal;

a detecting module to monitor an occurrence of a trigger event at the device by detecting trigger events from envelope information of the broadcast program signal, and to cease monitoring of the occurrence of a further trigger event once the trigger event has been detected and the broadcast program signal is being recorded; and an activating module which, upon occurrence of the trigger event, activates the recording module.

15. The device as claimed in claim 14, in which the detecting module is configured additionally to detect a trigger event which is an incoming telephone call.

16. The device as claimed in claim 14, in which the detecting module is configured additionally to detect a trigger event which is an outgoing telephone call.

17. The device as claimed in claim 14, in which the trigger event is the identification of predetermined content in the received signal.

18. The device as claimed in claim 17, which includes an entering means for entering of the predetermined content.

19. The device as claimed in claim 14, in which the trigger event is the provision of a programming start indicator.

20. The device as claimed in claim 14, which includes a manual prompting means for prompting manual activation of the recording module by a user of the device.

21. The device as claimed in claim 14, which includes a reproducing means for reproducing the recorded broadcast program.

22. The device as claimed in claim 21, in which the recording module continues to record the broadcast program while the reproducing means reproduces part of the broadcast program previously recorded.

23. The device as claimed in claim 21, which includes a pausing means for pausing reproduction of a broadcast program upon detection of a trigger event.

24. The device as claimed in claim 14, which includes an alerting means for alerting a user that recording of a broadcast program has commenced.

25. The device as claimed in claim 14, in which the broadcast program is selected from an analog radio broadcast, a digital radio broadcast, an analog television broadcast, a digital television broadcast, an analog movie broadcast and a digital movie broadcast.

26. An integrated mobile communication and broadcast program reproduction device which includes:

means for receiving a broadcast program signal;

means for monitoring an occurrence of a trigger event at the device by detecting the trigger event from envelope information of the broadcast program signal;

means for recording the broadcast program signal received by the device upon occurrence of the trigger event; and means for ceasing to monitor the occurrence of a further trigger event once the trigger event has been detected and the broadcast program signal is being recorded.

* * * * *